United States Patent
Wang

(10) Patent No.: US 8,559,067 B2
(45) Date of Patent: Oct. 15, 2013

(54) TRANSMISSION MECHANISM FOR SCANNING DEVICE

(75) Inventor: Chih-Hwa Wang, Taipei County (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 555 days.

(21) Appl. No.: 12/883,190

(22) Filed: Sep. 16, 2010

(65) Prior Publication Data

US 2011/0273749 A1  Nov. 10, 2011

(30) Foreign Application Priority Data

May 7, 2010 (TW) ................................ 99114633 A

(51) Int. Cl.
*H04N 1/04* (2006.01)
(52) U.S. Cl.
USPC .......................................................... 358/474
(58) Field of Classification Search
None
See application file for complete search history.

(56) References Cited

U.S. PATENT DOCUMENTS

| 5,880,852 A * | 3/1999 | Asano et al. ................... 358/296 |
| 8,218,204 B2 * | 7/2012 | Hozono ......................... 358/474 |
| 2002/0054376 A1 * | 5/2002 | Wada ............................. 358/472 |

FOREIGN PATENT DOCUMENTS

| CN | 2419612 | 2/2001 |
| CN | 2676299 | 2/2005 |
| CN | 1744653 | 3/2006 |
| TW | 200607329 | 2/2006 |
| TW | 200616433 | 5/2006 |
| TW | M366843 | 10/2009 |

OTHER PUBLICATIONS

"First Office Action of China Counterpart Application", issued on Apr. 27, 2013, p. 1-p. 6.
"Office Action of Taiwan Counterpart Application", issued on Apr. 29, 2013, p. 1-p. 4.

* cited by examiner

*Primary Examiner* — Jeremiah Bryar
(74) *Attorney, Agent, or Firm* — Jianq Chyun IP Office

(57) ABSTRACT

A scanning mechanism including a scanning unit, a rail and a transmission element is disclosed. The scanning unit has a connecting portion and a supporting portion, the scanning unit is slidely disposed on the rail through the supporting portion. The transmission element is connected to the connecting portion of the scanning unit to drive the scanning unit sliding along the rail, and the orthogonal projection of the connecting portion on the rail and the orthogonal projection of the supporting portion on the rail are overlapped with each other.

6 Claims, 3 Drawing Sheets

TRANSMISSION MECHANISM FOR SCANNING DEVICE

CROSS-REFERENCE TO RELATED APPLICATION

This application claims the priority benefit of Taiwan application serial no. 99114633, filed on May 7, 2010. The entirety of the above-mentioned patent application is hereby incorporated by reference herein and made a part of this specification.

BACKGROUND OF THE INVENTION

1. Field of the Invention

The present invention generally relates to a scanning mechanism, and more particularly, to a scanning mechanism of an optical scanning module 2. Description of Related Art Along with the progress of hardware and software, a scanner has become one of the basic equipments for a computer user, by which test data or image data such as file, magazine, book and picture can be scanned for further processing.

Among various scanners, a flatbed scanner is the most often one. To scan a file, a transmission mechanism including a motor, a set of gears disposed on a scanning unit and a transmission belt is required to drive the above-mentioned scanning unit, so that the scanning unit slips along a guiding shaft to accomplish scanning job on an object horizontally placed over the scanning unit.

In the mechanism however, since the above-mentioned motor, transmission belt and the set of gears are usually disposed at a side of the guiding shaft with a distance from the guiding shaft so that when the motor drives the scanning unit through the transmission belt, a torsion moment on the scanning unit is caused by the transmission belt. The torsion moment makes the scanning unit unable to move in parallel along the guiding shaft. As a result, the moving distances of both sides opposite to each other of the scanning unit are not the same so as to make the quality of the scanned image unstable.

SUMMARY OF THE INVENTION

Accordingly, the present invention is directed to a scanning mechanism enable to make the scanning unit thereof smoothly move.

The present invention provides a scanning mechanism, which includes a scanning unit, a rail and a transmission element, wherein the scanning unit has a connecting portion and a supporting portion, the scanning unit is slidely disposed on the rail through the supporting portion, the transmission element is connected to the connecting portion of the scanning unit to drive the scanning unit sliding along the rail, and the orthogonal projection of the connecting portion on the rail and the orthogonal projection of the supporting portion on the rail are overlapped with each other.

In an embodiment of the present invention, the above-mentioned connecting portion and supporting portion are substantially located at the center of the scanning unit.

In an embodiment of the present invention, the above-mentioned scanning unit has both side surfaces opposite to each other and the transmission element is a synchronous belt, wherein an end of the synchronous belt is connected to one of the side surfaces of the scanning unit, while another end of the synchronous belt goes around the rail and is connected to the other one of the side surfaces of the scanning unit.

In an embodiment of the present invention, the above-mentioned synchronous belt and the rail are substantially located on a same plane.

In an embodiment of the present invention, the above-mentioned scanning mechanism further includes a base disposed under the scanning unit, wherein the above-mentioned rail is a protrusion extending from the base towards the scanning unit.

In an embodiment of the present invention, the above-mentioned scanning mechanism further includes a guiding rod disposed under the scanning unit, and the above-mentioned rail is a partial rod surface on the guiding rod where the supporting portion is supported by.

In an embodiment of the present invention, the above-mentioned guiding rod has a hollow portion, and the synchronous belt goes through the hollow portion to connect the scanning unit.

Based on the depiction above, in the above-mentioned embodiment of the present invention, since the orthogonal projection of the connecting portion for the scanning unit to connect the transmission element on the rail and the orthogonal projection of the supporting portion for the scanning unit to couple the rail on the rail are overlapped with each other, so that when the transmission element drives the scanning unit to slide along the rail, the above-mentioned layout makes the transmission element produce no torsion moment causing yaw. In short, the scanning mechanism is able to make the scanning unit slide in parallel along the rail, which contributes to advance the scanning quality of the scanning unit.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
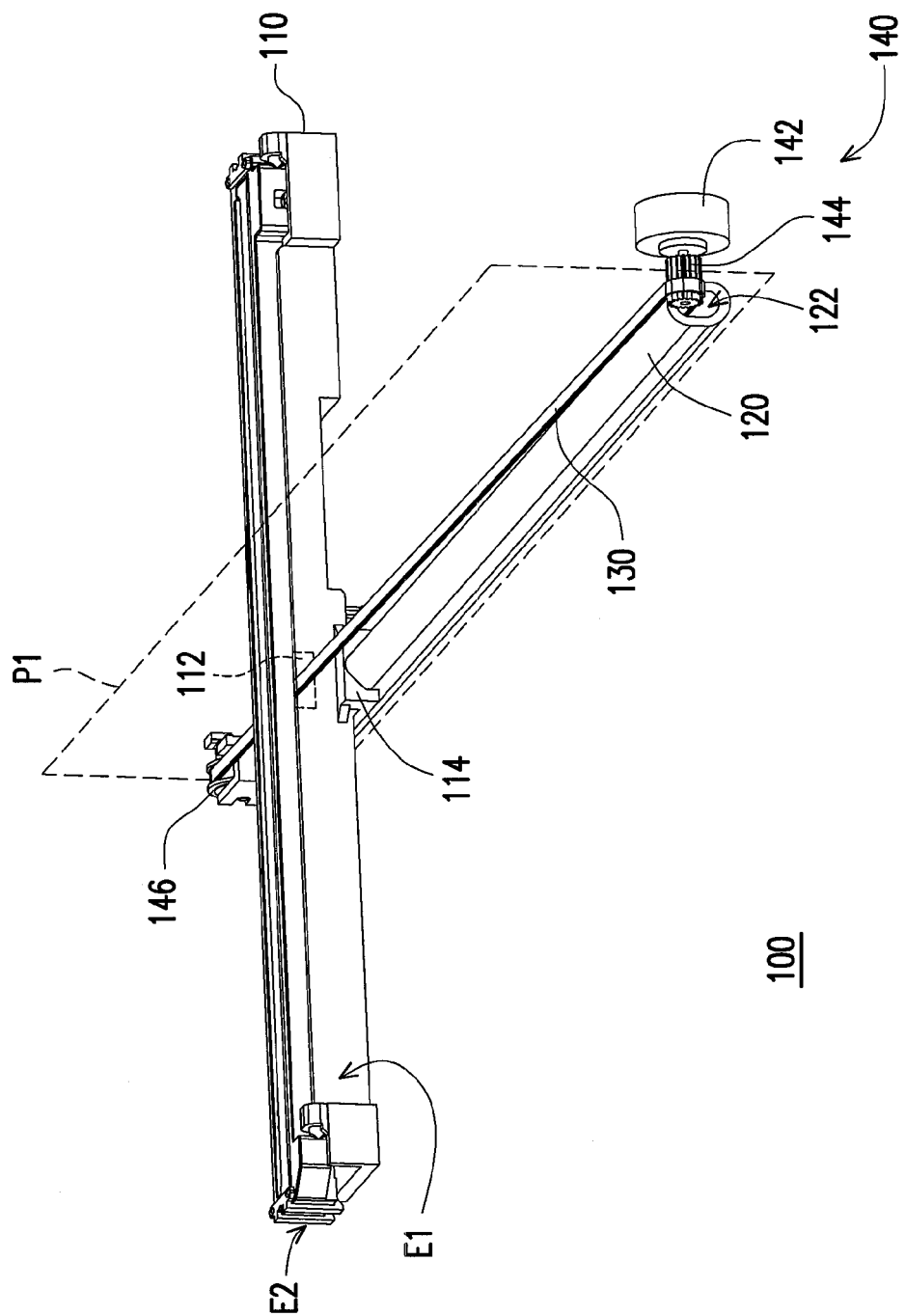
FIG. 1 is a diagram of a scanning mechanism according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a scanning mechanism according to an embodiment of the present invention. Referring to FIG. 1, in the embodiment, a scanning mechanism 100 is used in a scanner (not shown) and includes a scanning unit 110, a rail 120 and a transmission element 130. The scanning unit 110 is, for example, a set of charge coupled devices (a set of CCDs) (not shown) for performing optical sensing on an object so as to accomplish image-scanning. The scanning unit 110 has a connecting portion 112 and a supporting portion 114, wherein the scanning unit 110 is slidely disposed on the rail 120 through the supporting portion 114. The transmission element 130 is connected to the connecting portion 112 of the scanning unit 110 so as to drive the scanning unit 110 sliding along the rail 120.

The orthogonal projection of the connecting portion 112 on the rail 120 and the orthogonal projection of the supporting portion 114 on the rail 120 are overlapped with each other. In other words, the rail 120, the connecting portion 112 and the supporting portion 114 in the embodiment are located on a same plane P1, and the connecting portion 112 is located over the supporting portion 114. In this way, when the scanning unit 110 is driven by the transmission element 130 to slide along the rail 120, the resulting moment on the scanning unit 110 applied by the transmission element 130 is substantially equal to zero, which results in that the transmission element 130 would drive the scanning unit 110 slide in parallel along the rail 120 without producing a torsion moment to make the scanning unit 110 yaw. As a result, the unequal scanning distances at both sides opposite to each other of the scanning unit 110 can be avoided.

In more details, in the embodiment, the transmission element 130 is, for example, a synchronous belt, wherein an end of the belt is connected to a first side surface E1 of the scanning unit 110, while another end thereof goes around the rail 120 and is connected to a second side surface E2 of the scanning unit 110 opposite to the first side surface E1. In the embodiment, the transmission element 130 is connected onto the connecting portion 112 of the scanning unit 110 by, for example, a clamping mechanism (not shown). Furthermore, the connecting portion 112 and the supporting portion 114 are substantially located at the center of the scanning unit 110. However, the embodiment does not limit the structure shape of the transmission element 130 and the mechanism by which the transmission element 130 is connected to the scanning unit 110. In another unshown embodiment of the present invention, the transmission element can be also a rope or a chain, and the clamping mechanism can be modified along with different types of the transmission element.

In the embodiment, the scanning mechanism 100 includes a transmission module 140, and the transmission module 140 includes a motor 142, a gear of driving synchronous belt 144, a pulley 146 and the above-mentioned transmission element 130. The gear of driving synchronous belt 144 is disposed on the motor 142, the transmission element 130 is engaged with the gear of driving synchronous belt 144 and the transmission element 130 is supported by the pulley 146. The pulley 146 further has an adjustment mechanism (not shown) for adjusting the belt tension. However, the embodiment does not limit the forms of the motor 142, the gear of driving synchronous belt 144 and the pulley 146 in the transmission module 140. In fact, other forms for driving the transmission element 130 are allowed, and the above-mentioned embodiment is one of many embodiments of the present invention only.

In addition, the present invention does not limit the positions of the connecting portion 112 and the supporting portion 114 on the scanning unit 110. In another unshown embodiment of the present invention, under the following conditions that all the rail 120, the connecting portion 112 and the supporting portion 114 are located on a same plane and the connecting portion 112 is located right upper the supporting portion 114, the connecting portion 112 and the supporting portion 114 can be located at any one of both the sides, i.e., the rail 120 can go through any one of the sides of the scanning unit 110.

In the embodiment, the rail 120 is, for example, a guiding rod located under the scanning unit 110, the scanning unit 110 is coupled onto a partial surface of the guiding rod through the supporting portion 114, and the transmission element 130 and the rail 120 are substantially located on the plane P1, which makes the force on the scanning unit 110 by the transmission element 130 is parallel to the rail 120 and located on the plane P1 to ensure the transmission element 130 not producing a torsion moment on the scanning unit 110 and to avoid the scanning unit 110 from getting yaw. Moreover, the rail 120 has a hollow portion 122, wherein the transmission element 130 goes through the hollow portion 122 to be connected to the scanning unit.

Figure 2:
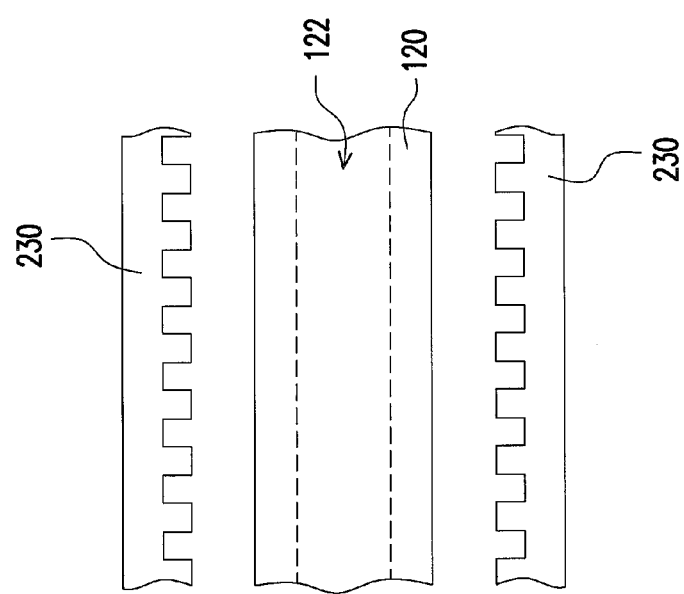
FIG. 2 is a localized sectional diagram at the transmission element and the rail of a scanning mechanism according to another embodiment of the present invention.

However, the embodiment does not limit the implemented design. FIG. 2 is a localized sectional diagram at the transmission element and the rail of a scanning mechanism according to another embodiment of the present invention. Referring to FIG. 2, different from the above-mentioned embodiment, the transmission element 230 of the embodiment goes around the hollow portion 122 of the rail 120, i.e., the synchronous belt in the embodiment surrounds the guiding rod from up to down to up, which has the same effect as the above-mentioned embodiment.

It is to say the present invention does not limit the structure shape of the rail 120. In another unshown embodiment of the present invention, the rail can be a guiding rod with different section shapes.

Figure 3:
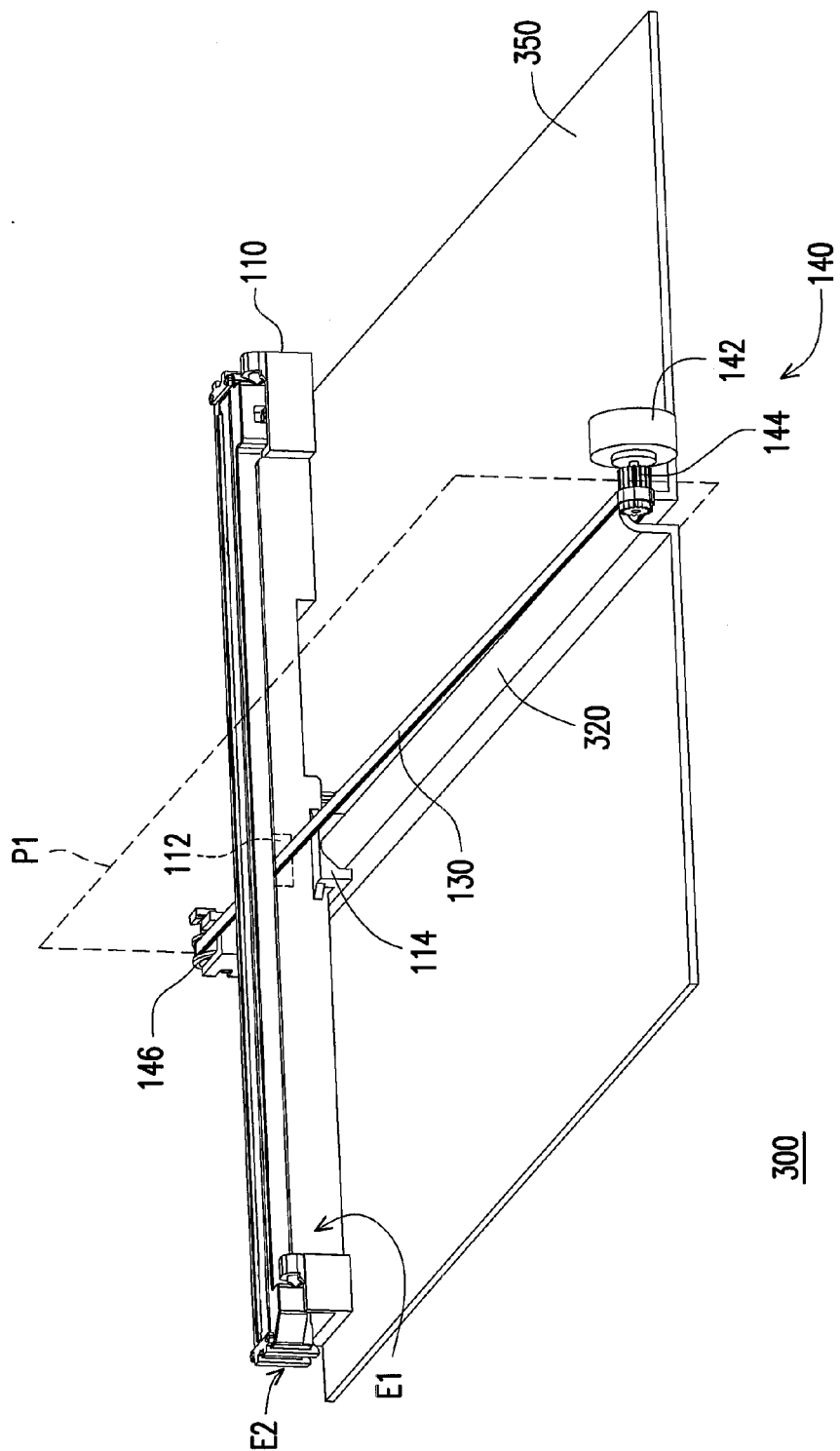
FIG. 3 is a diagram of a scanning mechanism according to yet another embodiment of the present invention.

FIG. 3 is a diagram of a scanning mechanism according to yet another embodiment of the present invention. Referring to FIG. 3, in the embodiment, a scanning mechanism 300 includes the transmission element 130 and the scanning unit 110 which are the same as the ones in the above-mentioned embodiment except that the scanning mechanism 300 further includes a base 350 disposed under the scanning unit 110. The rail 320 is a protrusion extending from the base 350 towards the scanning unit 110. In this way, the scanning unit 110 can be slidely coupled onto the rail 320 through the supporting portion 114. In addition, the transmission element 130 goes through from under the base 350 so as to connect the scanning unit 110.

It can be seen from the embodiments of FIGS. 1 and 3, the present invention does not limit the structure shapes of the rail 120 or the rail 320. Any layout making the rail 120 (or 320), the connecting portion 112 and the supporting portion 114 located on a same plane is suitable for the present invention. In other words, the designer can modify the structure shapes of the rail 120 or the rail 320 or choose an appropriate combination of the rail 120 or the rail 320 with other parts inside the scanner according to the space inside the scanner and the transmission method.

In summary, in the above-mentioned embodiments of the present invention, through a design that the orthogonal projection of the connecting portion on the rail and the orthogonal projection of the supporting portion on the rail are overlapped with each other, the connecting portion, the supporting portion and the rail of the scanning mechanism are located on a same plane and the connecting portion is located over the supporting portion. With the layout, there is no torsion moment to cause the scanning unit to get yaw produced when the scanning unit is driven by the transmission element, which further makes the scanning unit slide along the rail in parallel. The design is advantageous in that the opposite both sides of the scanning module move over the same distance in a unit time, which effectively increases the stability of the scanning unit during sliding and advances the image scanning quality of the scanning mechanism.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention.

What is claimed is:

1. A transmission mechanism for scanning device, comprising:
   a scanning unit, having a connecting portion and a supporting portion;
   a rail, wherein the scanning unit is slidely disposed on the rail through the supporting portion; and
   a transmission element, connected to the connecting portion of the scanning unit to drive the scanning unit sliding along the rail, wherein the rail is located on a plane, the scanning unit slides on the plane, and an orthogonal projection of the connecting portion on the plane and an orthogonal projection of the supporting portion on the plane are overlapped with each other,
   wherein the scanning unit has two side surfaces opposite to each other, the two side surfaces are both orthogonal to moving directions of the scanning unit, and the transmission element is a synchronous belt, and an end of the synchronous belt is connected to one of the two side surfaces of the scanning unit, while another end of the synchronous belt goes around the rail and is connected to the other one of the two side surfaces of the scanning unit.

2. The transmission mechanism for scanning device as claimed in claim 1, wherein the connecting portion and the supporting portion are located at a center of a length along a longitudinal axis of the scanning unit.

3. The transmission mechanism for scanning device as claimed in claim 1, wherein the synchronous belt and the rail are located on a same plane orthogonal to a longitudinal axis of the scanning unit.

4. The transmission mechanism for scanning device as claimed in claim 1, further comprising:
   a base, disposed under the scanning unit, wherein the rail is a protrusion extending from the base towards the scanning unit.

5. The transmission mechanism for scanning device as claimed in claim 1, further comprising:
   a guiding rod, disposed under the scanning unit, wherein a partial rod surface of the guiding rod leaning against the supporting portion forms the rail.

6. The transmission mechanism for scanning device as claimed in claim 5, wherein the guiding rod has a hollow portion, and the synchronous belt goes through the hollow portion and connects the scanning unit.

* * * * *